US012564533B2

(12) United States Patent
Hung et al.

(10) Patent No.: US 12,564,533 B2

(45) Date of Patent: Mar. 3, 2026

(54) ELECTRIC ASSISTIVE DEVICE

(71) Applicant: Wistron Corporation, New Taipei City (TW)

(72) Inventors: Shih Wei Hung, New Taipei City (TW); Cheng-Hsing Liu, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 237 days.

(21) Appl. No.: 18/330,379

(22) Filed: Jun. 7, 2023

(65) Prior Publication Data

US 2024/0374458 A1 Nov. 14, 2024

(30) Foreign Application Priority Data

May 9, 2023 (TW) ................................ 112117191

(51) Int. Cl.
*A61H 3/04* (2006.01)

(52) U.S. Cl.
CPC ......... *A61H 3/04* (2013.01); *A61H 2003/043* (2013.01); *A61H 2201/0165* (2013.01); *A61H 2201/503* (2013.01)

(58) Field of Classification Search
CPC ................ A61H 3/04; A61H 2003/043; A61H 2201/0165; A61H 2201/503; B62D 51/00
See application file for complete search history.

(56) References Cited

U.S. PATENT DOCUMENTS

| | | | | |
|---|---|---|---|---|
| 4,251,105 A * | 2/1981 | Barker | A61H 3/04 | 482/67 |
| 6,122,585 A * | 9/2000 | Ono | B60T 8/445 | 303/166 |
| 6,536,544 B1 * | 3/2003 | Egawa | A61H 3/04 | 180/19.3 |
| 2005/0005691 A1 * | 1/2005 | Ono | B60T 8/172 | 73/146 |

(Continued)

FOREIGN PATENT DOCUMENTS

| | | |
|---|---|---|
| JP | 2001108572 A * | 4/2001 |
| TW | I745116 | 11/2021 |

OTHER PUBLICATIONS

"Office Action of Taiwan Counterpart Application", issued on Sep. 6, 2023, p. 1-p. 9.

*Primary Examiner* — Dale W Hilgendorf
*Assistant Examiner* — Frank T Glenn, III
(74) *Attorney, Agent, or Firm* — JCIPRNET

(57) ABSTRACT

An electric assistive device is provided. The electric assistive device includes a power wheel module, an upper control module, and a power control module. The upper control module is configured to provide a dynamic characteristic parameter. The power control module is coupled to the power wheel module and the upper control module. In response to operating the electric assistive device in an auxiliary walking mode, the power control module adaptively generates a first vehicle speed parameter according to a dynamic characteristic parameter and a force estimation parameter. The power control module generates a voltage control signal according to the first vehicle speed parameter. The power control module drives the power wheel module according to the voltage control signal.

17 Claims, 5 Drawing Sheets

(56) References Cited

U.S. PATENT DOCUMENTS

| | | | | | |
|---|---|---|---|---|---|
| 2005/0082911 | A1* | 4/2005 | Anwar | B60T 8/17616 303/171 |
| 2011/0071752 | A1* | 3/2011 | Takenaka | B62K 1/00 701/124 |
| 2011/0282529 | A1* | 11/2011 | Song | B60L 15/20 701/22 |
| 2012/0042917 | A1* | 2/2012 | Workman | A61H 3/04 135/66 |
| 2013/0306120 | A1* | 11/2013 | Fukunaga | A61H 3/04 135/85 |
| 2016/0014252 | A1* | 1/2016 | Biderman | A61G 5/04 701/29.2 |
| 2024/0099185 | A1* | 3/2024 | Xia | A01D 34/78 |

* cited by examiner

ELECTRIC ASSISTIVE DEVICE

CROSS-REFERENCE TO RELATED APPLICATION

This application claims the priority benefit of Taiwan application serial no. 112117191, filed on May 9, 2023. The entirety of the above-mentioned patent application is hereby incorporated by reference herein and made a part of this specification.

BACKGROUND

Technical Field

The disclosure relates to a power apparatus, and more particularly to an electric assistive device having adaptive driving characteristics.

Description of Related Art

Most of the existing power assistive devices simply receive external motor rotation speed commands to directly control the motor rotation speed. However, when the user applies a pushing or pulling force to the power assistive device at the same time, conventional power assistive devices cannot determine the strength of the user's force and cannot intuitively and actively respond to changes in the user's force instantly, which may lead to dangerous operation or inability to provide relevant protection effects.

SUMMARY

The disclosure provides an electric assistive device that enables adaptive driving function.

The electric assistive device of the disclosure includes a power wheel module, an upper control module, and a power control module. The upper control module is configured to provide a dynamic characteristic parameter. The power control module is coupled to the power wheel module and the upper control module. In response to operating the electric assistive device in an auxiliary walking mode, the power control module adaptively generates a first vehicle speed parameter according to a dynamic characteristic parameter and a force estimation parameter. The power control module generates a voltage control signal according to the first vehicle speed parameter. The power control module drives the power wheel module according to the voltage control signal.

The electric assistive device of the disclosure includes a power wheel module, an upper control module, and a power control module. The upper control module is configured to provide a dynamic characteristic parameter. The power control module is coupled to the power wheel module and the upper control module. In response to operating the electric assistive device in an auxiliary walking mode, the power control module adaptively generates a first vehicle speed parameter according to a dynamic characteristic parameter and a force estimation parameter. The power control module generates a voltage control signal according to the first vehicle speed parameter. The power control module drives the power wheel module according to the voltage control signal. The power control module determines the force estimation parameter according to Equation $$F_{uc} = M_r \frac{dS_r}{dt} + D_r S_r + F_f + F_s - F_{wc}.$$

Symbol $F_{uc}$ represents the force estimation parameter. Symbol $M_r$ represents the equivalent inertia parameter of the electric assistive device. Symbol $S_r$ represents a current vehicle speed parameter of the electric assistive device. Symbol $D_r$ represents the equivalent damping of the electric assistive device. Symbol $F_f$ represents Coulomb friction parameter. Symbol $F_s$ represents the slope equivalent force parameter. Symbol $F_{wc}$ represents the equivalent force parameter of the electric assistive device.

Based on the above, the electric assistive device of the disclosure may operate corresponding vehicle speed parameters based on the user-set or default specific dynamic characteristic parameter and the force estimation parameter corresponding to the current force exerted to the electric assistive device, to serve as a control command for adaptively driving the electric assistive device, so that the electric assistive device may achieve good adaptive driving performance.

In order to make the above-mentioned features and advantages of the disclosure comprehensible, embodiments accompanied with drawings are described in detail below.

DESCRIPTION OF THE EMBODIMENTS

Some embodiments of the disclosure accompanied with the drawings will now be described in detail. These examples are only a portion of the disclosure and do not disclose all possible embodiments of the disclosure. More precisely, these embodiments are only examples of the device and method within the scope of the patent application of the disclosure.

Figure 1:
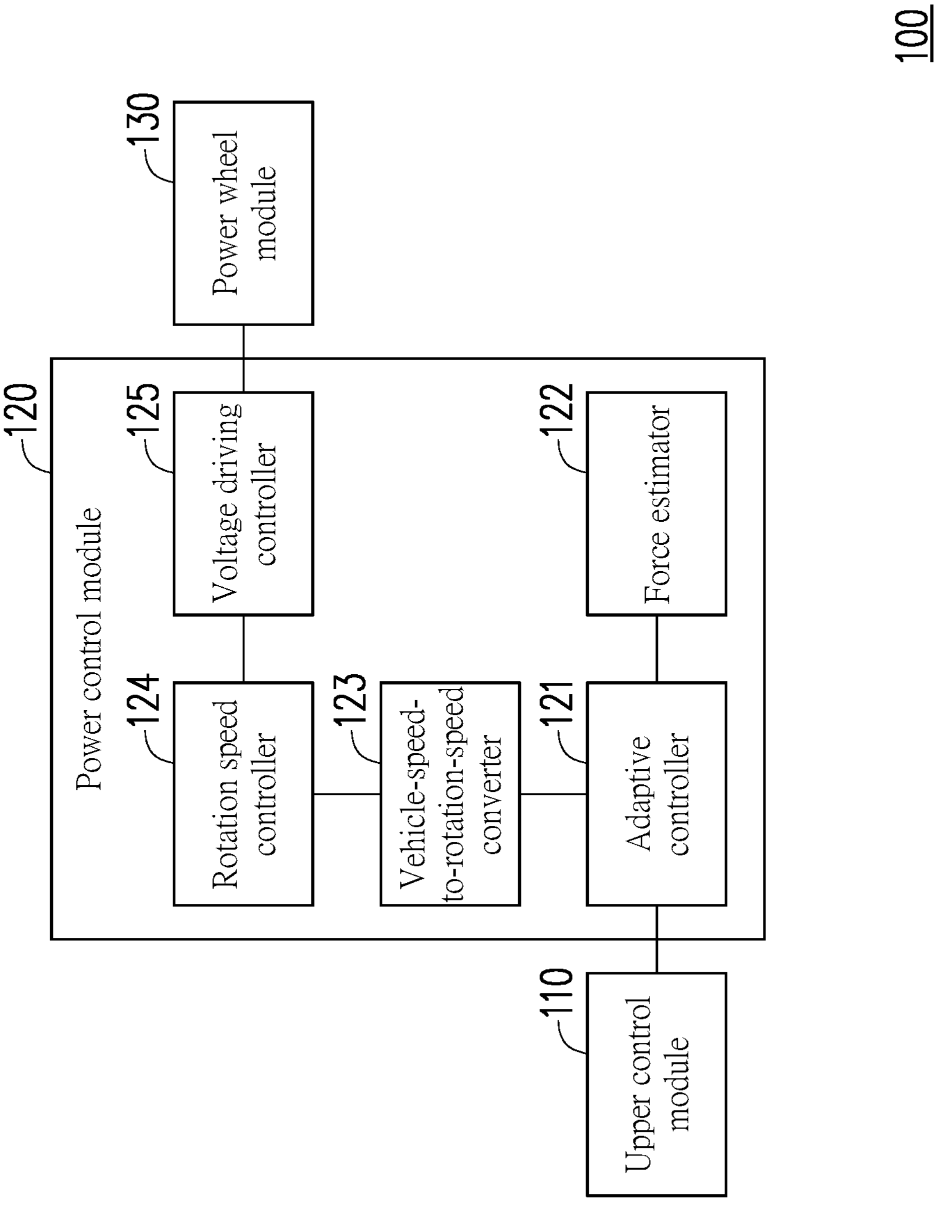
FIG. 1 is a schematic view of an electric assistive device according to an embodiment of the disclosure.

FIG. 1 is a schematic view of an electric assistive device according to an embodiment of the disclosure. Referring to FIG. 1, the electric assistive device 100 includes an upper control module 110, a power control module 120, and a power wheel module 130. The power control module 120 is coupled (electrically connected) to the upper control module 110 and the power wheel module 130. The power control module 120 includes an adaptive controller 121, a force estimator 122, a vehicle-speed-to-rotation-speed converter 123, a rotation speed controller 124, and a voltage driving controller 125.

In this embodiment, the upper control module 110 may include an upper controller circuit. The upper control module 110 and the power control module (PCM) 120 may be respectively implemented by a central processing unit (CPU), a microprocessor control unit (MCU), or a field programmable gate array (FPGA), and other processing circuits, chips, or circuits with data operation functions, but the disclosure is not limited thereto.

In this embodiment, the power control module 120 may be implemented by, for example, corresponding software (program) and hardware circuits. For example, the adaptive controller 121, the force estimator 122, and the vehicle-speed-to-rotation-speed converter 123 may be implemented by software (program) and stored in the memory of the electric assistive device 100, to be read and executed by the processor of the electric assistive device 100 or the computing circuits used to implement the power control module. The rotation speed controller 124 and the voltage driving controller 125 may be motor control circuits, which include related algorithms to be executed to achieve respective functions. In addition, the above-mentioned memory may be, for example, a non-volatile memory such as a read only memory (ROM), an erasable programmable read only memory (EPROM), a random access memory (RAM), and a storage device such as a hard disc drive, a semiconductor memory, etc., which may be used to store data such as various parameters, commands, and programs mentioned in the disclosure.

In this embodiment, the upper control module 110 may provide a dynamic characteristic parameter to the adaptive controller 121. The dynamic characteristic parameter may be generated through user setting, system default setting, or operation, and is used to respond to the dynamic characteristics of the upper control module 110. The force estimator 122 may generate a force estimation parameter by operating multiple physical property parameters corresponding to the electric assistive device 100 and provide the force estimation parameter to the adaptive controller 121. In this way, the adaptive controller 121 may generate a first vehicle speed parameter according to the dynamic characteristic parameter and the force estimation parameter.

In an embodiment, the dynamic characteristic parameter may include at least one of a target inertia and a target damping. The force estimator 122 may determine (operate) the first vehicle speed parameter according to the Equation (1). In Equation (1), symbol $S_r^*$ represents the first vehicle speed parameter. Symbol $M_g$ represents the target inertia. Symbol s represents a Laplace transform factor. Symbol $D_g$ represents the target damping. Symbol $F_{uc}$ represents the (equivalent) force estimation parameter.

In this embodiment, in response to operating the electric assistive device 100 in an auxiliary walking mode, the adaptive controller 121 may adaptively generate the first vehicle speed parameter according to the dynamic characteristic parameter and the force estimation parameter and provide a control command of the first vehicle speed parameter to the converter 123. In addition, in response to operating the electric assistive device 110 in the auxiliary walking mode, the vehicle-speed-to-rotation-speed converter 123 may convert the control command with the first vehicle speed parameter into a motor rotation speed parameter. Next, the rotation speed controller 124 may generate a voltage control signal according to the motor rotation speed parameter. Thus, the voltage driving controller 125 may drive the power wheel module 130 according to the voltage control signal.

In an embodiment, the electric assistive device 100 may also operate in a rider mode. The upper control module 110 may directly control the speed of the electric assistive device 100 according to the user's operation or setting. In this regard, in response to operating the electric assistive device 100 in the rider mode, the upper control module 110 may generate another first vehicle speed parameter according to the user's operation or setting and provide a control command with another first vehicle speed parameter to the vehicle-speed-to-rotation-speed converter 123. Thus, in response to operating the electric assistive device 110 in the rider mode, the vehicle-speed-to-rotation-speed converter 123 may convert the control command with the another first vehicle speed parameter into a motor rotation speed parameter, and then directly drive the power wheel module 130. In another point of view, the electric assistive device 100 may realize the dual mode power control function.

Figure 2:
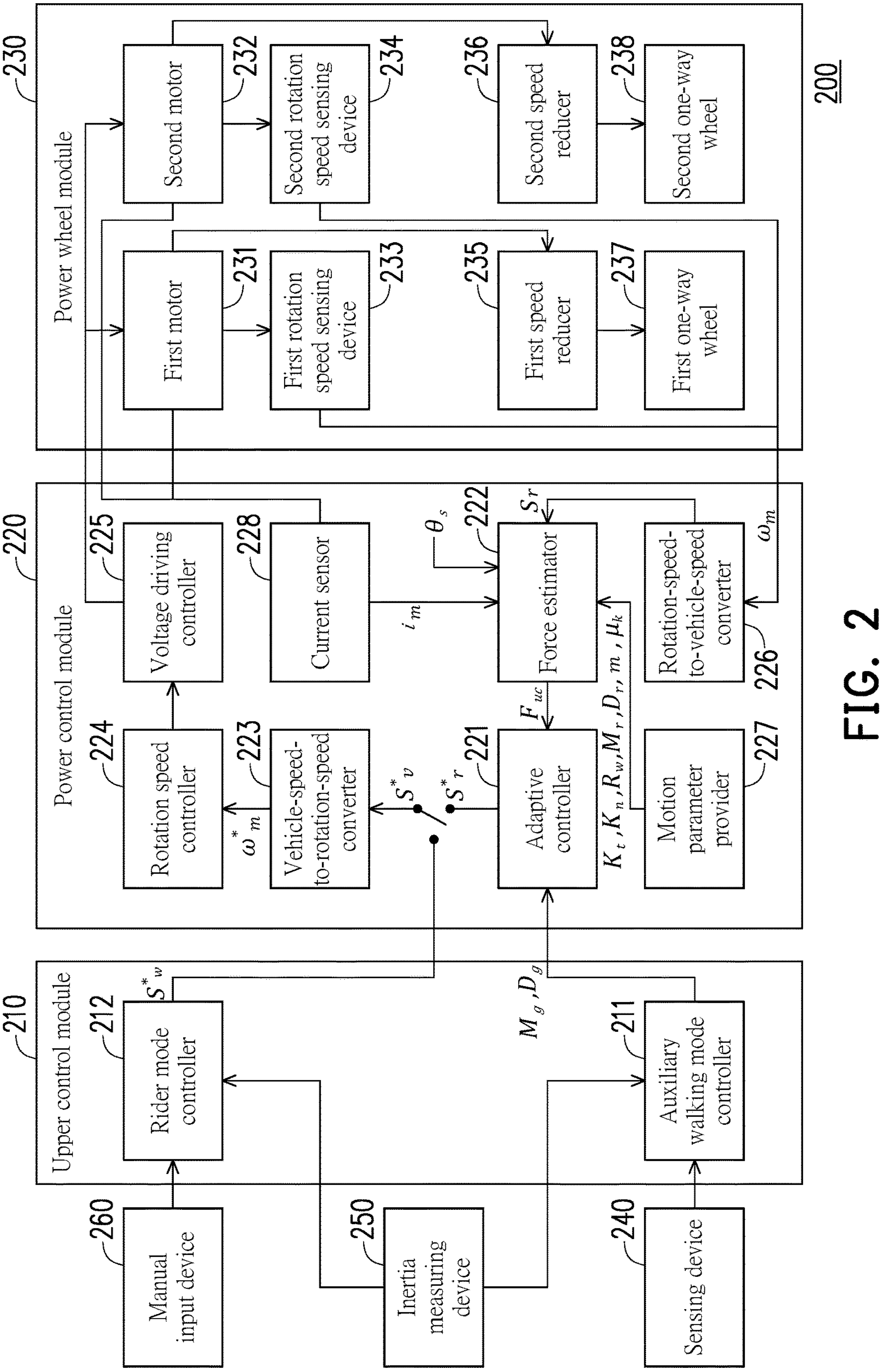
FIG. 2 is a schematic view of an electric assistive device according to another embodiment of the disclosure.

FIG. 2 is a schematic view of an electric assistive device according to another embodiment of the disclosure. The electric assistive device 200 in FIG. 2 may be a specific implementation manner of the electric assistive device 100 in FIG. 1. Referring to FIG. 2, the electric assistive device 200 may include an upper control module 210, a power control module 220, a power wheel module 230, a sensing device 240, an inertia measuring device 250, and a manual input device 260. The power control module 220 is coupled to the upper control module 210 and the power wheel module 230. The upper control module 210 is further coupled to the sensing device 240, the inertia measuring device 250, and the manual input device 260. In this embodiment, the electric assistive device 200 may be, for example, an electric wheelchair, an electric walking aid, an electric skateboard, or other related walking aiding equipment. In this embodiment, the electric assistive device 200 may have a dual mode power control function. The electric assistive device 200 may operate in the auxiliary walking mode or the rider mode. In this embodiment, the upper control module 210 includes an auxiliary walking mode controller 211 and a rider mode controller 212. The power control module 220 includes an adaptive controller 221, a force estimator 222, a vehicle-speed-to-rotation-speed converter 223, a rotation speed controller 224, a voltage driving controller 225, a rotation-speed-to-vehicle-speed converter 226, a motion parameter provider 227, and a current sensor 228. The power wheel module 230 includes a first motor 231, a second motor 232, a first rotation speed sensing device 233, a second rotation speed sensing device 234, a first speed reducer 235, a second speed reducer 236, a first one-way wheel 237, and a second one-way wheel 238. In an embodiment, the power wheel module 230 may include one motor, one rotation speed sensing device, one speed reducer, and one one-way wheel.

In this embodiment, the auxiliary walking mode controller 211 is coupled to the sensing device 240 and the inertia measuring device 250. The rider mode controller 212 is coupled to the inertia measuring device 250 and the manual input device 260. In this embodiment, the adaptive controller 211 is coupled to the force estimator 222, the auxiliary walking mode controller 211, and the vehicle-speed-to-rotation-speed converter 223. The force estimator 222 is further coupled to the rotation-speed-to-vehicle-speed converter 226, the motion parameter provider 227, and the current sensor 228. The vehicle-speed-to-rotation-speed converter 223 is further coupled to the rotation speed controller 224 and the rider mode controller 212. The rotation speed controller 224 is further coupled to the voltage driving controller 225. The voltage driving controller 225 is further coupled to the first motor 231 and the second motor 232. In this embodiment, the first motor 231 is coupled to the first rotation speed sensing device 233 and the first speed reducer 235. The first one-way wheel 237 is coupled to the first speed reducer 235. The second motor 232 is coupled to the second rotation speed sensing device 234 and the second speed reducer 236. The second one-way wheel 238 is coupled to the second speed reducer 236.

In this embodiment, the auxiliary walking mode controller 211 and the rider mode controller 212 are respectively a type of control circuit. For example, the adaptive controller 221, the force estimator 222, the vehicle-speed-to-rotation-speed converter 223, the rotation-speed-to-vehicle-speed converter 226, and the motion parameter provider 227 may be implemented by software (program) and stored in the memory of the electric assistive device 200, to be read and executed by the processor of the electric assistive device 200 or the computing circuits used to implement the power control module. The motion parameter provider 227 may also be, for example, implemented in the form of a database, to pre-store related parameters. The rotation speed controller 224 and the voltage driving controller 225 may be motor control circuits, which include related algorithms to be executed to achieve respective functions. The first rotation speed sensing device 233 and the second rotation speed sensing device 224 are respectively a type of motor sensor, such as a Hall-effect sensor. The first speed reducer 235 and the second speed reducer 236 may be respectively a type of power transmission device, such as having a gear box to connect the motor and the one-way wheel. The sensing device 240 may, for example, include one or more push-pull force gauges. The inertia measuring device 250 may be, for example, a G-sensor or a accelerometer. The manual input device 260 may, for example, include a button, a joystick, a touch screen, or a related human machine interface (HMI).

$$S_r^* = \frac{1}{M_g s + D_g} F_{uc} \qquad \text{Equation (1)}$$

In this embodiment, in response to operating the electric assistive device 200 in the auxiliary walking mode, the force estimator 222 may determine (operate) the force estimation parameter $F_{uc}$ according to the Equation (2). In addition, the adaptive controller 221 may determine the first vehicle speed parameter $S_r$ according to the above Equation (1). In Equation (2), symbol $F_{uc}$ represents the force estimation parameter. Symbol $M_r$ represents the equivalent inertia parameter of the electric assistive device 200. Symbol $S_r$ represents the second vehicle speed parameter of the electric assistive device 200. Symbol $D_r$ represents the equivalent damping of the electric assistive device 200. Symbol $F_f$ represents the Coulomb friction parameter. Symbol $F_s$ represents the slope equivalent force parameter. Symbol $F_{wc}$ represents the equivalent force parameter of the electric assistive device 200. In addition, the following embodiments further explain in detail how to obtain each parameter.

In this embodiment, the sensing device 240 may provide the push and pull force sensing information of the electric assistive device 200 to the auxiliary walking mode controller 211. The push and pull force sensing information may be, for example, the strength of the push or pull force currently received by the electric assistive device 200 from the user. The inertial measuring device 250 may provide the physical status information of the electric assistive device 200 to the auxiliary walking mode controller 211. The physical status information may be, for example, the current acceleration, the angular velocity, and the travel speed of the electric assistive device 200. The auxiliary walking mode controller 211 may generate a dynamic characteristic parameter according to the push and pull force sensing information and the physical status information. In this embodiment, the dynamic characteristic parameter may include the target inertia $M_g$ and the target damping $D_g$.

The auxiliary walking mode controller 211 may further receive the second vehicle speed parameter $S_r$ of the electric assistive device 200 generated by the rotation-speed-to-vehicle-speed converter 226 (i.e., the current vehicle speed of the electric assistive device 200) and the force estimation parameter $F_{uc}$* of the user generated by the force estimator 222. In this regard, the auxiliary walking mode controller 211 may, for example, judge whether the current operation environment of the electric assistive device 200 is flat ground, uphill, or downhill based on at least one of the push and pull force sensing information, the physical status information, the second vehicle speed parameter $S_r$, and the user force estimation parameter $F_{uc}$, or judge whether the user is operating the electric assistive device 200 abnormally (e.g., abnormal acceleration or the user falling), and set the corresponding target inertia $M_g$ and target damping $D_g$. Alternatively, in an embodiment, the target inertia $M_g$ and the target damping $D_g$ may also be manually set by the user. The auxiliary walking mode controller 211 may provide a control command with the target inertia $M_g$ and the target damping $D_g$ to the adaptive controller 221.

Figure 3A:
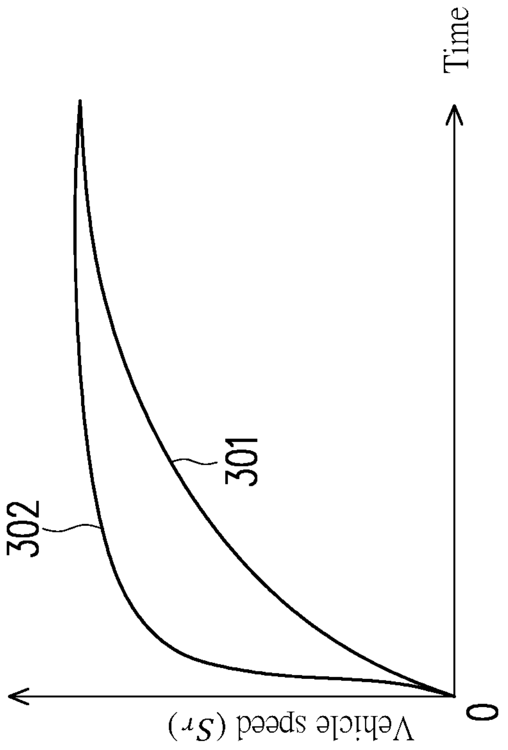
FIG. 3A is a relationship curve between an inertia and a vehicle speed according to an embodiment of the disclosure.

Referring to FIG. 3A, FIG. 3A is a relationship curve between an inertia and a vehicle speed according to an embodiment of the disclosure. In response to a high target inertia $M_g$, the corresponding modulation effect on the speed variation of the electric assistive device 200 over time is shown by a curve 301. In response to a low target inertia $M_g$, the corresponding modulation effect on the speed variation of the electric assistive device 200 over time is shown by a curve 302. In this regard, in response to a high target inertia $M_g$ being set, the acceleration rate of the electric assistive device 200 is relatively gentle. Conversely, in response to a low target inertia $M_g$ being set, the acceleration rate of the electric assistive device 200 is relatively abrupt.

Figure 3B:
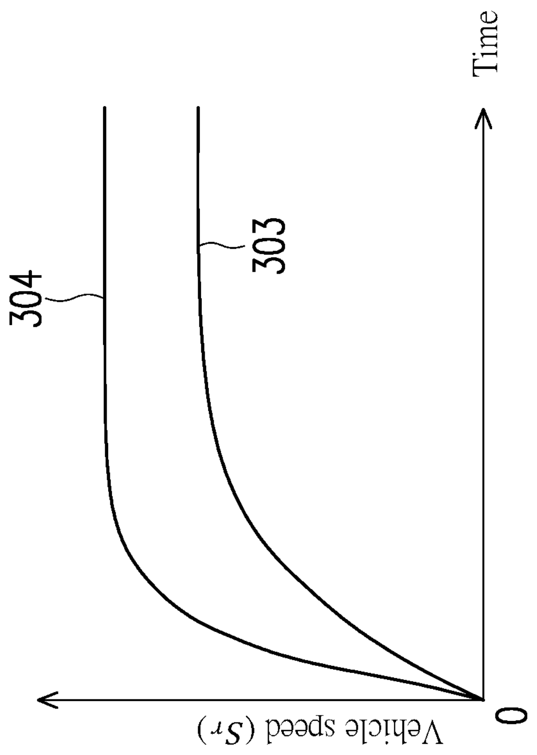
FIG. 3B is a relationship curve between a damping and a vehicle speed according to an embodiment of the disclosure.

Referring to FIG. 3B, FIG. 3B is a relationship curve between a damping and a vehicle speed according to an embodiment of the disclosure. In response to a high target damping $D_g$, the corresponding modulation effect on the speed variation of the electric assistive device 200 over time is shown by a curve 303. In response to a low target damping $D_g$, the corresponding modulation effect on the speed variation of the electric assistive device 200 over time is shown by a curve 304. In this regard, in response to a high target damping $D_g$ being set, the time for the speed of the electric assistive device 200 to reach a steady state is longer, and the terminal velocity of the vehicle is also lower. Conversely, in response to a low target damping $D_g$ being set, the time for the speed of the electric assistive device 200 to reach a steady state is shorter, and the terminal velocity of the vehicle is also higher.

Regarding the impact of the current operating environment of the electric assistive device 200, whether it is on flat ground, uphill, or downhill, on the force exerted to the electric assistive device 200, examples will be explained below using FIG. 4A to FIG. 4C.

$$F_{uc} = M_r \frac{dS_r}{dt} + D_r S_r + F_f + F_s - F_{wc} \qquad \text{Equation (2)}$$

Figure 4A:
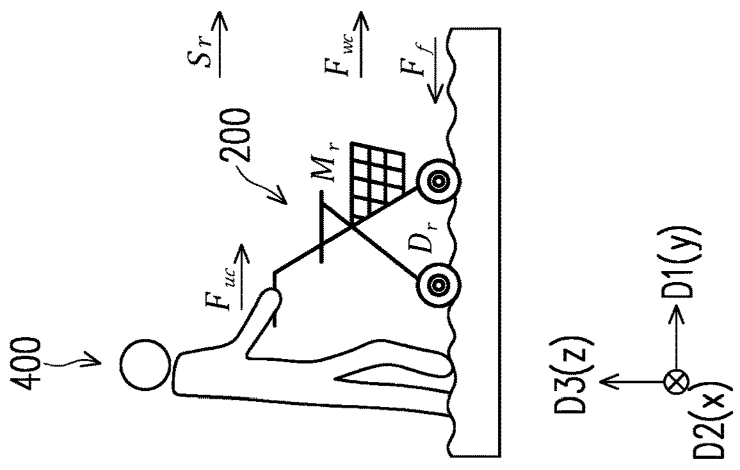
FIG. 4A is a schematic view of an electric assistive device operating on a flat ground according to an embodiment of the disclosure.

Referring to FIG. 4A, FIG. 4A is a schematic view of an electric assistive device operating on a flat ground according to an embodiment of the disclosure. FIG. 4A is a side schematic view illustrating a scenario of a user 400 operating the electric assistive device 200 on a flat ground. As shown in FIG. 4A, a direction D1, a direction D2, and a direction D3 may be perpendicular to each other. A plane formed by extending along the direction D1 (corresponding to the y-axis defined in the following operations) and the direction D2 (corresponding to the x-axis defined in the following operations) may be a horizontal plane. The direction D3 (corresponding to the z-axis defined in the following operations) may be a vertical direction. As shown in FIG. 3A, the electric assistive device 200 may have a current equivalent inertia $M_r$ and a current equivalent damping $D_r$. The electric assistive device 200 may move forward in the direction of D1 and acquire a second vehicle speed parameter $S_r$ (i.e., the current speed of the electric assistive device 200). In addition, the equivalent force (i.e., the force parameter $F_{wc}$) of the first one-way wheel 237 and the second one-way wheel 238 of the electric assistive device 200, which is equivalent to the center (e.g., the overall weight center (centroid) of the electric assistive device 200) of the electric assistive device 200, may also be oriented in the direction D1. The friction (i.e., the Coulomb friction parameter $F_f$) generated by the electric assistive device 200 traveling on the ground may be oriented in a direction opposite to the direction D1. The force exerted by the user 400 on the electric assistive device 200 (i.e., the force estimation parameter $F_{uc}$) may also be oriented in the direction D1.

Figure 4B:
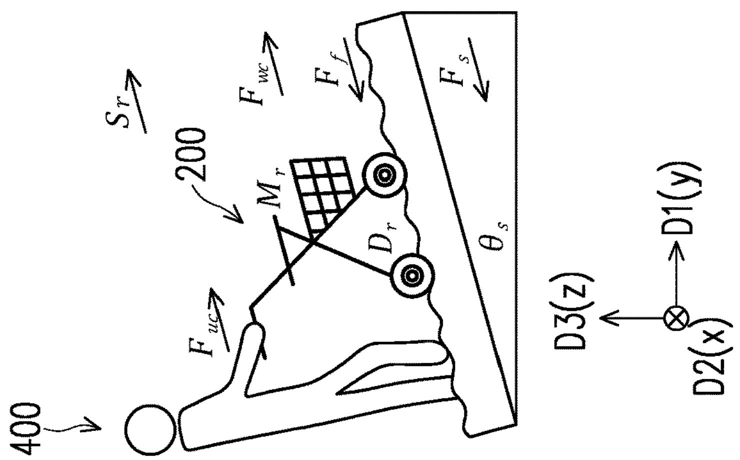
FIG. 4B is a schematic view of an electric assistive device operating uphill according to an embodiment of the disclosure.

Referring to FIG. 4B, FIG. 4B is a schematic view of an electric assistive device operating uphill according to an embodiment of the disclosure. As shown in FIG. 4B, the electric assistive device 200 may have a current equivalent inertia $M_r$ and a current equivalent damping $D_r$. The electric assistive device 200 may move forward in a direction parallel to a slope surface and extending upward and acquire a second vehicle speed parameter $S_r$ (i.e., the current speed of the electric assistive device 200). In addition, the equivalent force (i.e., the force parameter $F_{wc}$) of the first one-way wheel 237 and the second one-way wheel 238 of the electric assistive device 200, which is equivalent to the center of the electric assistive device 200, may also be oriented in the forward (uphill) direction of the electric assistive device 200. The friction (i.e., the Coulomb friction parameter $F_f$) generated by the electric assistive device 200 traveling on the ground may be oriented in a direction opposite to the forward (uphill) direction of the electric assistive device 200. The force exerted by the user 400 on the electric assistive device 200 (i.e., the force estimation parameter $F_{uc}$) may also be oriented in the forward (uphill) direction of the electric assistive device 200. Also, the slope equivalent force (slope equivalent force parameter $F_s$) generated by the electric assistive device 200 on the slope may be oriented in a direction opposite to the forward (uphill) direction of the electric assistive device 200.

Figure 4C:
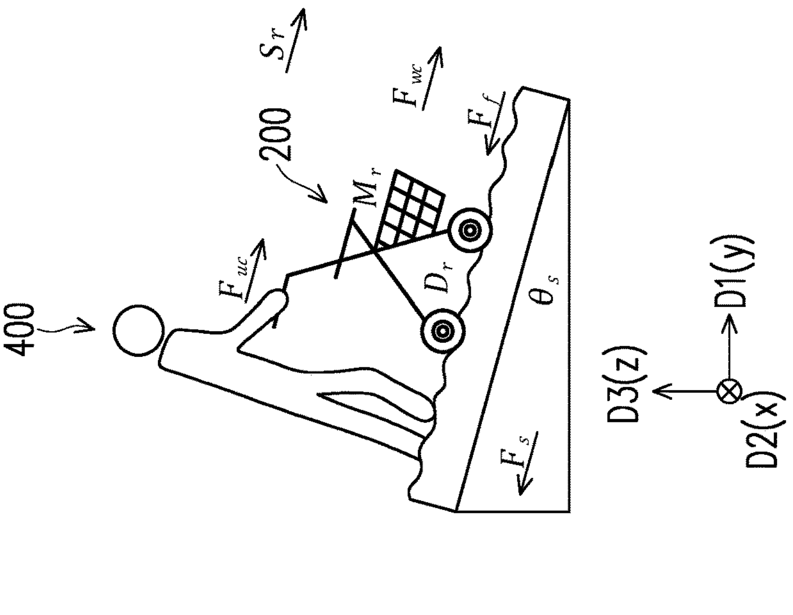
FIG. 4C is a schematic view of an electric assistive device operating downhill according to an embodiment of the disclosure.

Referring to FIG. 4C, FIG. 4C is a schematic view of an electric assistive device operating downhill according to an embodiment of the disclosure. As shown in FIG. 4C, the electric assistive device 200 may have a current equivalent inertia $M_r$ and a current equivalent damping $D_r$. The electric assistive device 200 may move forward in a direction parallel to a slope surface and extending downward and acquire a second vehicle speed parameter $S_r$ (i.e., the current speed of the electric assistive device 200). In addition, the equivalent force (i.e., the force parameter $F_{wc}$) of the first one-way wheel 237 and the second one-way wheel 238 of the electric assistive device 200, which is equivalent to the center of the electric assistive device 200, may also be oriented in the forward (downhill) direction of the electric assistive device 200. The friction (i.e., the Coulomb friction parameter $F_f$) generated by the electric assistive device 200 traveling on the ground may be oriented in a direction opposite to the forward (downhill) direction of the electric assistive device 200. The force exerted by the user 400 on the electric assistive device 200 (i.e., the force estimation parameter $F_{uc}$) may also be oriented in the forward (downhill) direction of the electric assistive device 200. Also, the slope equivalent force (slope equivalent force parameter $F_s$) generated by the electric assistive device 200 on the slope may be oriented in a direction opposite to the forward (downhill) direction of the electric assistive device 200.

In this embodiment, the motion parameter provider 227 may provide the built-in parameter and the estimation parameter to the force estimator 222. The built-in parameter may include a weight parameter m, a one-way wheel radius parameter $R_w$, a motor torque versus current constant $K_t$, and a speed reducer reduction ratio $K_n$ of the electric assistive device 200, or at least one of the above parameters. The estimation parameter may include an equivalent damping $D_r$, an equivalent inertia $M_r$, and an equivalent Coulomb's friction coefficient $\mu_k$ of the electric assistive device 200, or at least one of the above parameters. In this embodiment, the force estimator 222 may generate a force estimation parameter according to the built-in parameters and the estimation parameters $F_{uc}$.

In this embodiment, the force estimator 222 may estimate the force estimation parameter $F_{uc}$ based on the resultant forces equivalent to the center of the electric assistive device 200 based on the various situation changes in FIG. 4A to FIG. 4C and Equation (2).

Figure 5:
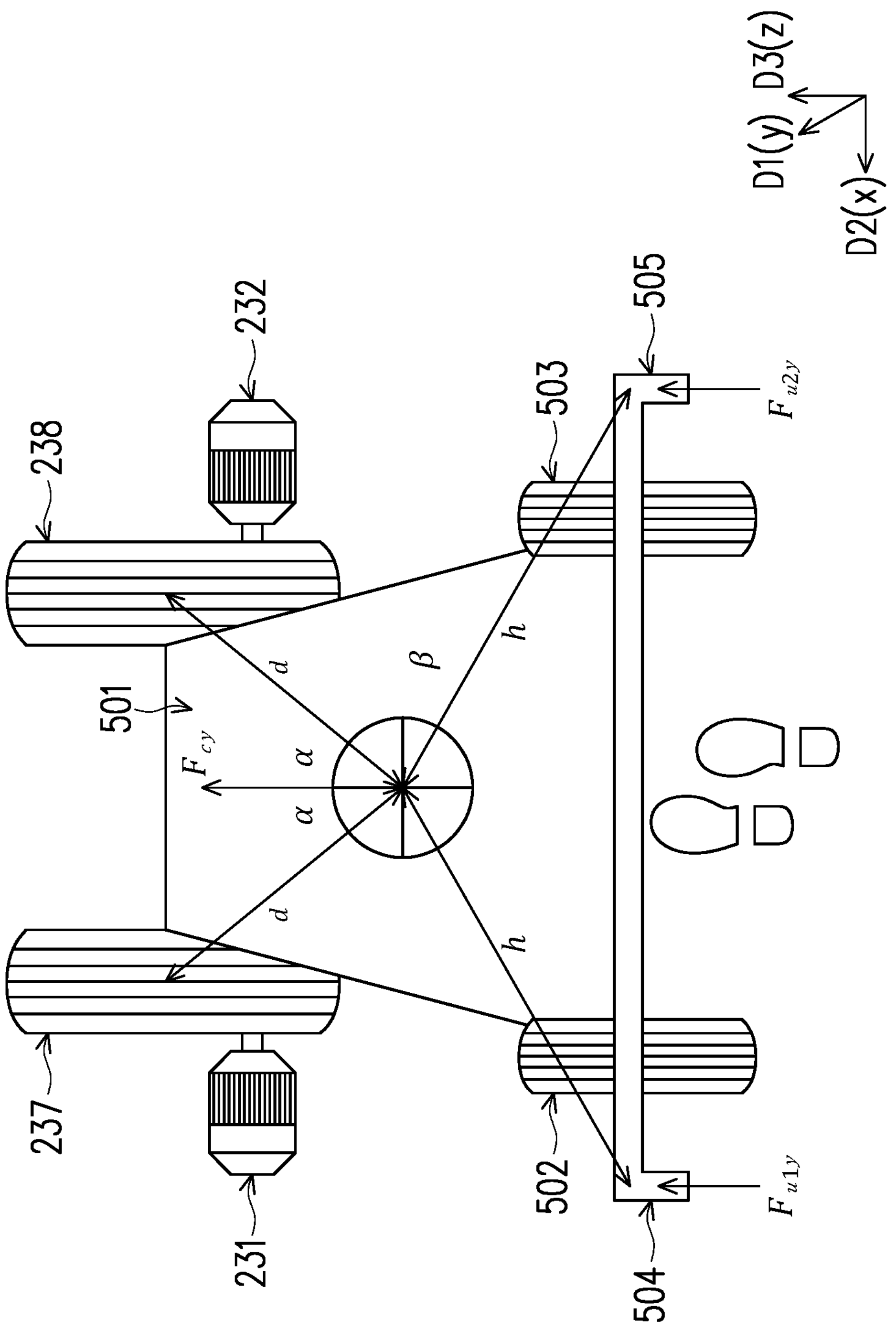
FIG. 5 is a top schematic view of an electric assistive device according to an embodiment of the disclosure.

FIG. 5 is a top schematic view of an electric assistive device according to an embodiment of the disclosure. Referring to FIG. 2 and FIG. 5 together, the electric assistive device 200 may further include a base 501, wheels 502 and 503 (freely rotatable), and grips 504 and 505. The first one-way wheel 237 and the second one-way wheel 238 are disposed on two sides of the front of the base 501. The first motor 231 is configured to drive the first one-way wheel 237. The second motor 232 is configured to drive the first one-way wheel 238. The wheels 502 and 503 are disposed on two sides of the rear of the base 501. Moreover, the grips 504 and 505 may be disposed on two sides of the rear of the base 501 for the user to hold and operate the electric assistive device 200. The sensing device 240 includes, for example, two push-pull force gauges, which are respectively disposed on the grip 504 and the grip 505, so as to sense the result of the force exerted by the user on the grip 504 and the grip 505, respectively.

In this embodiment, the equivalent damping $D_r$ of the electric assistive device 200 may be determined according to Equation (3), and is built into the motion parameter provider 227. In Equation (3), symbol $D_{ry}$ represents the equivalent damping of the electric assistive device 200 on the y-axis. Symbol $D_{rz}$ represents the equivalent damping of the electric assistive device 200 on the z-axis.

$$D_r = \begin{bmatrix} D_{ry} & 0 \\ 0 & D_{rz} \end{bmatrix} \quad \text{Equation (3)}$$

In this embodiment, the equivalent inertia $M_r$ of the electric assistive device 200 may be determined according to Equation (4), and is built into the motion parameter provider 227. In Equation (4), symbol $M_{ry}$ represents the equivalent inertia of the electric assistive device 200 on the y-axis. Symbol $I_{rz}$ represents the equivalent inertia of the electric assistive device 200 on the $$M_r = \begin{bmatrix} M_{ry} & 0 \\ 0 & I_{rz} \end{bmatrix} \quad \text{Equation (4)}$$

In this embodiment, the equivalent coulomb's friction coefficient $\mu_k$ of the electric assistive device 200 may be determined according to Equation (5), and is built into the motion parameter provider 227. In Equation (5), symbol $\mu_{ky}$ represents the equivalent coulomb's friction coefficient of the electric assistive device 200 on the y-axis. Symbol $\mu_{kz}$ represents the equivalent coulomb's friction coefficient of the electric assistive device 200 on the z-axis.

$$\mu_k = \begin{bmatrix} \mu_{ky} \\ \mu_{kz} \end{bmatrix} \quad \text{Equation (5)}$$

In this embodiment, the electric assistive device 200 may further include a slope sensor (not shown in the figure), and the slope sensor may be coupled to the force estimator 222 to provide a slope parameter $\theta_s$ to the force estimator 222. Alternatively, the slope parameter $\theta_s$ may also be manually input by the user. In an embodiment, the force estimator 222 may estimate the force estimation parameter $S_r$ according to the built-in parameter, the estimation parameter, the second vehicle speed parameter $\theta_s$, and the slope parameter $F_{uc}$.

In this embodiment, the force estimator 222 may operate the slope equivalent force parameter $F_s$ according to Equation (6). In Equation (6), symbol $F_{sy}$ represents the slope equivalent force received by the electric assistive device 200 on the y-axis. Symbol $N_{sz}$ represents the slope equivalent force received by the electric assistive device 200 on the z-axis. Symbol m represents the weight of the electric assistive device 200. Symbol g represents the gravitational acceleration. Symbol $\theta_p$ represents the slope angle of the slope surface.

$$F_s = \begin{bmatrix} F_{sy} \\ N_{sz} \end{bmatrix} = \begin{bmatrix} \text{mg } \sin(\theta_s)\cos(\theta_p) \\ 0 \end{bmatrix} \quad \text{Equation (6)}$$

In this embodiment, the force estimator 222 may operate the coulomb friction parameter $F_r$ according to Equation (7). In Equation (7), symbol $F_{fy}$ represents the equivalent coulomb friction received by the electric assistive device 200 on the y-axis. Symbol $N_{fz}$ represents the equivalent coulomb friction received by the electric assistive device 200 on the z-axis.

$$F_f = \begin{bmatrix} F_{fy} \\ N_{fz} \end{bmatrix} = \mu_k \text{mg } \cos(\theta_s) = \begin{bmatrix} \mu_{ky}\text{mg } \cos(\theta_s) \\ \mu_{kz}\text{mg } \cos(\theta_s) \end{bmatrix} \quad \text{Equation (7)}$$

In this embodiment, the first rotation speed sensing device 223 may provide the first motor rotation speed parameter $\omega_{m1}$ to the rotation-speed-to-vehicle-speed converter 226. The second rotation speed sensing device 224 may provide another first motor rotation speed parameter $\omega_{m2}$ to the rotation-speed-to-vehicle-speed converter 226. The rotation-speed-to-vehicle-speed converter 226 may convert the first motor rotation speed parameter and another first motor rotation speed parameter $\omega_{m1}$ into the second vehicle speed parameter $\omega_{m2}$ according to Equation (8) and Equation (9) $S_r$. The first motor rotation speed parameter $\omega_{m1}$ and another first motor rotation speed parameter $\omega_{m2}$ may be combined into one motor rotation speed parameter $\omega_m$ in matrix form. First, the rotation-speed-to-vehicle-speed converter 226 may operate the rotation-speed-to-vehicle-speed conversion matrix $M_{wr}$ according to Equation (9). In Equation (9), symbol d is the distance between the center of the electric assistive device 200 and the first one-way wheel 237 and the second one-way wheel 238. Symbol $\alpha$ is the included angle between the connecting lines between the center of the electric assistive device 200 and the first one-way wheel 237 and the second one-way wheel 238 and the y-axis. Next, the rotation-speed-to-vehicle-speed converter 226 may obtain the second vehicle speed parameter $S_r$ according to the operational result of Equation (8).

$$S_r = \frac{R_w}{K_n} M_{wr} \begin{bmatrix} \omega_{m1} \\ \omega_{m2} \end{bmatrix} \quad \text{Equation (8)}$$

$$M_{wr} = \begin{bmatrix} \frac{1}{2} & \frac{1}{2} \\ \frac{-1}{2d\sin(\alpha)} & \frac{1}{2d\sin(\alpha)} \end{bmatrix} \quad \text{Equation (9)}$$

In this embodiment, the current sensor 228 may sense the first motor 231 and the second motor 232 to generate a first current sensing parameter $I_{m1}$ and a second current sensing parameter $I_{m2}$. The first current sensing parameter $I_{m1}$ and the second current sensing parameter $I_{m2}$ may be combined into one current sensing parameter $I_{m1}$ in matrix form. The current sensor 228 may provide the first current sensing parameter $I_{m1}$ and the second current sensing parameter $I_{m2}$ to the force estimator 222. The force estimator 222 may operate the equivalent force parameter $F_{wc}$ of the electric assistive device 200 according to Equation (10) and Equation (11). First, the force estimator 222 may first operate a matrix $M_{wf}$ according to Equation (11). The matrix $M_{wf}$ is the force conversion matrix of the first one-way wheel 237 and the second one-way wheel 238 exerting force to the center of the electric assistive device 200. Then, the force estimator 222 may obtain the equivalent force parameter $F_{wc}$ of the electric assistive device 200 generated by the first motor 231 and the second motor 232 exerting force on the first one-way wheel 237 and the second one-way wheel 238 according to the operational result of Equation (10). In Equation (10), symbol $K_{t1}$ is the motor torque versus current constant of the first motor 231. Symbol $K_{t2}$ is the motor torque versus current constant of the second motor 232.

$$F_{wc} = \frac{K_n}{R_w} M_{wf} \begin{bmatrix} K_{t1} I_{m1} \\ K_{t2} I_{m2} \end{bmatrix} \quad \text{Equation (10)}$$

$$M_{wf} = \begin{bmatrix} 1 & 1 \\ -d\sin(\alpha) & d\sin(\alpha) \end{bmatrix} \quad \text{Equation (11)}$$

Therefore, the force estimator 222 may estimate the force estimation parameter $F_{uc}$ instantly and dynamically according to Equation (3) to Equation (11).

In addition, the force estimator 222 may further operate the user force estimation parameter $F_{uc}$* according to Equation (12) and Equation (13). First, the force estimator 222 may operate a matrix $M_{uf}^{-1}$ according to Equation (13). The matrix $M_{uf}^{-1}$ is an inverse transformation matrix of the force exerted by the user to the center of the electric assistive device 200. In Equation (13), symbol h is the distance between the center of the electric assistive device 200 and the first one-way wheel 237 and the second one-way wheel 238. Symbol β is the included angle between the connecting lines between the center of the electric assistive device 200 and the first one-way wheel 237 and the second one-way wheel 238 and the x-axis. Next, the force estimator 222 may obtain the user's force estimation parameter $F_{uc}$* according to the operational result of Equation (12). In Equation (12), symbol $F_{u1y}$ is the force exerted by the user on the grip 504. Symbol $F_{u1y}$ is the force exerted by the user on the grip 505. Symbol $F_{ucy}$ is the equivalent force exerted by the user to the center of the electric assistive device 200 on the y-axis direction. Symbol $N_{ucz}$ is the equivalent force exerted by the user to the center of the electric assistive device 200 on the z-axis direction.

$$F_{uc}^* = \begin{bmatrix} F_{u1y} \\ F_{u2y} \end{bmatrix} = M_{uf}^{-1} F_{uc} = M_{uf}^{-1} \begin{bmatrix} F_{ucy} \\ N_{ucz} \end{bmatrix} \quad \text{Equation (12)}$$

$$M_{uf}^{-1} = \begin{bmatrix} \frac{1}{2} & \frac{-1}{2h\cos(\beta)} \\ \frac{1}{2} & \frac{1}{2h\cos(\beta)} \end{bmatrix} \quad \text{Equation (13)}$$

In this embodiment, the manual input device 260 may provide manual input information. The inertial measuring device 250 may provide the physical status information of the electric assistive device 200. The physical status information may be, for example, the current acceleration, the angular velocity, and the travel speed of the electric assistive device 200. The rider mode controller 212 may directly generate another first vehicle speed parameter $s_w$* according to the manual input information and the physical status information.

In this embodiment, in response to the electric assistive device 200 operating in the auxiliary walking mode, the vehicle-speed-to-rotation-speed converter 223 may convert the first vehicle speed parameter S; into a second motor rotation speed parameter $\omega_m$*. Alternatively, in response to the electric assistive device 200 operating in a rider mode, the vehicle-speed-to-rotation-speed converter 223 converts the another first vehicle speed parameter $s_w$*I not the second motor rotation speed parameter $\omega_m$*.

In this embodiment, the vehicle-speed-to-rotation-speed converter 223 may operate the motor rotation speed parameter $\omega_{m1}$* and the motor rotation speed parameter $\omega_{m1}$* expected to be realized by the first motor 231 and the second motor 232, respectively, based on Equation (14) and Equation (15) First, the force estimator 222 may operate the vehicle-speed-to-rotation-speed conversion matrix $M_{rw}$ according to Equation (15). Next, the force estimator 222 may operate Equation (14) to obtain the motor rotation speed parameter $\omega_{m1}$* and the motor rotation speed parameter $\omega_{m2}$*. In Equation (14), symbol $S^*_v$ is the vehicle speed parameter and may be replaced by the first vehicle speed parameter $S^*_r$ or the another first vehicle speed parameter $s_w$*.

$$\begin{bmatrix} \omega_{m1}^* \\ \omega_{m2}^* \end{bmatrix} = \frac{K_n}{R_w} M_{rw} S_v^* \quad \text{Equation (14)}$$

$$M_{rw} = \begin{bmatrix} 1 & -d\sin(\alpha) \\ 1 & d\sin(\alpha) \end{bmatrix} \quad \text{Equation (15)}$$

In this embodiment, the rotation speed controller 224 may generate corresponding first voltage control signal and second voltage control signal according to the motor rotation speed parameter $\omega_{m1}$* and the motor rotation speed parameter $\omega_{m2}$*. The voltage driving controller 225 may drive the first motor 231 and the second motor 232 of the power wheel module 230 according to the first voltage control signal and the second voltage control signal, so that the first motor 231 and the second motor 232 may respectively drive the first one-way wheel 237 and the second one-way wheel 238 through the first speed reducer 235 and the second speed reducer 236 according to the first driving voltage and the second voltage control signal. Therefore, the electric assistive device 200 of this embodiment may provide a dual mode power control function. In particular, in response to operating the electric assistive device 200 in the auxiliary walking mode, the electric assistive device 200 may adaptively adjust the driving degrees of the first motor 231 and the second motor 232 according to the results of various equivalent forces currently received by the electric assistive device 200, thereby providing an effective walking assistance function and/or ensuring the user's walking safety. Thus, the power control module 220 may drive the power wheel module 230 directly or adaptively.

To sum up, the electric assistive device of the disclosure may provide dual mode power control function. In particular, in response to operating the electric assistive device in the auxiliary walking mode, the electric assistive device may consider the results of various equivalent forces currently received to adjust the driving degree of the motor adaptively, so that the electric assistive device may provide an effective walking assistance function and/or ensure the user's walking safety.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. An electric assistive device, comprising:

a power wheel module;

an upper control module, configured to provide a dynamic characteristic parameter; and a power control module, coupled to the power wheel module and the upper control module, wherein in response to operating the electric assistive device in an auxiliary walking mode, the power control module adaptively generates a first vehicle speed parameter according to the dynamic characteristic parameter and a force estimation parameter, and the power control module generates a voltage control signal according to the first vehicle speed parameter, wherein the power control module drives the power wheel module according to the voltage control signal, wherein the dynamic characteristic parameter comprises at least one of a target inertia and a target damping, wherein the power control module comprises:

a force estimator, configured to generate the force estimation parameter by operating a plurality of physical property parameters corresponding to the electric assistive device; and an adaptive controller, coupled to the upper control module and the force estimator and configured to generate the first vehicle speed parameter according to the dynamic characteristic parameter and the force estimation parameter, wherein the power control module determines the first vehicle speed parameter according to:

$$S_r^* = \frac{1}{M_g s + D_g} F_{uc},$$

wherein symbol $S_r$* represents the first vehicle speed parameter, symbol $M_g$ represents the target inertia, symbol s represents a Laplace transform factor, symbol $D_g$ represents the target damping, and symbol $F_{uc}$ represents the force estimation parameter.

2. The electric assistive device according to claim 1, wherein the upper control module comprises:

an auxiliary walking mode controller, coupled to the adaptive controller, wherein the electric assistive device further comprises:

a sensing device, coupled to the auxiliary walking mode controller and configured to provide a push and pull force sensing information of the electric assistive device; and an inertia measuring device, coupled to the auxiliary walking mode controller and configured to provide a physical status information of the electric assistive device, wherein the auxiliary walking mode controller generates the dynamic characteristic parameter according to the push and pull force sensing information and the physical status information.

3. The electric assistive device according to claim 1, wherein the power control module further comprises:

a motion parameter provider, coupled to the force estimator and configured to provide a built-in parameter and an estimation parameter to the force estimator, wherein the force estimator estimates the force estimation parameter according to the built-in parameter and the estimation parameter.

4. The electric assistive device according to claim 3, wherein the built-in parameter comprises at least one of a weight parameter, an one-way wheel radius parameter, a motor torque versus current constant, and a speed reducer reduction ratio of the electric assistive device.

5. The electric assistive device according to claim 3, wherein the estimation parameter comprises at least one of an equivalent damping, an equivalent inertia, and an equivalent Coulomb's friction coefficient of the electric assistive device.

6. The electric assistive device according to claim 3, wherein the power control module further comprises:

a rotation-speed-to-vehicle-speed converter, coupled to the force estimator, wherein the power wheel module comprises:

a first motor; and a first rotation speed sensing device, coupled to the first motor and the rotation-speed-to-vehicle-speed converter and configured to provide a first motor rotation speed parameter to the rotation-speed-to-vehicle-speed converter, the rotation-speed-to-vehicle-speed converter converts the first motor rotation speed parameter into a second vehicle speed parameter, wherein the force estimator estimates the force estimation parameter according to the built-in parameter, the estimation parameter, and the second vehicle speed parameter.

7. The electric assistive device according to claim 6, wherein the power control module further comprises:

a current sensor, coupled to the motor and configured to sense the first motor to generate a current sensing parameter, wherein the force estimator estimates the force estimation parameter according to the built-in parameter, the estimation parameter, the second vehicle speed parameter, and the current sensing parameter.

8. The electric assistive device according to claim 6, wherein the power wheel module further comprises:

a second motor; and a second rotation speed sensing device, coupled to the second motor and the rotation-speed-to-vehicle-speed converter and configured to provide another first motor rotation speed parameter to the rotation-speed-to-vehicle-speed converter, wherein the rotation-speed-to-vehicle-speed converter converts the first motor rotation speed parameter and the another first motor rotation speed parameter into the second vehicle speed parameter, wherein the force estimator estimates the force estimation parameter according to the built-in parameter, the estimation parameter, and the second vehicle speed parameter.

9. The electric assistive device according to claim 8, wherein the power control module further comprises:

a current sensor, coupled to the first motor and configured to sense the first motor and the second motor to generate a first current sensing parameter and a second current sensing parameter, wherein the force estimator estimates the force estimation parameter according to the built-in parameter, the estimation parameter, the second vehicle speed parameter, the first current sensing parameter, and the second current sensing parameter.

10. The electric assistive device according to claim 6, further comprising:

a slope sensor, coupled to the force estimator and configured to provide a slope parameter to the force estimator, wherein the force estimator estimates the force estimation parameter according to the built-in parameter, the estimation parameter, the second vehicle speed parameter, and the slope parameter.

11. The electric assistive device according to claim 1, wherein the power control module further comprises:

a vehicle-speed-to-rotation-speed converter, coupled to the adaptive controller;

a rotation speed controller, coupled to the vehicle-speed-to-rotation-speed converter; and a voltage driving controller, coupled to the rotation speed controller, wherein in response to the electric assistive device operating in the auxiliary walking mode, the vehicle-speed-to-rotation-speed converter converts the first vehicle speed parameter into a second motor rotation speed parameter, and the rotation speed controller generates a voltage control signal according to the second motor rotation speed parameter, wherein the voltage driving controller drives the power wheel module according to the voltage control signal.

12. The electric assistive device according to claim 11, wherein the upper control module comprises:

a rider mode controller, coupled to the vehicle-speed-to-rotation-speed converter, wherein the electric assistive device further comprises:

a manual input device, coupled to the rider mode controller and configured to provide a manual input information; and an inertia measuring device, coupled to the rider mode controller and configured to provide a physical status information of the electric assistive device, wherein the rider mode controller generates another first vehicle speed parameter according to the manual input information and the physical status information, wherein in response to the electric assistive device operating in a rider mode, the vehicle-speed-to-rotation-speed converter converts the another first vehicle speed parameter into the second motor rotation speed parameter.

13. The electric assistive device according to claim 1, wherein the power wheel module comprises:

a first motor, coupled to the power control module;

a first speed reducer, coupled to the first motor; and a first one-way wheel, coupled to the first speed reducer, wherein the power control module generates a first driving voltage according to the voltage control signal, and the first motor drives the first one-way wheel through the first speed reducer according to the first driving voltage.

14. The electric assistive device according to claim 13, wherein the power wheel module further comprises:

a second motor, coupled to the power control module;

a second speed reducer, coupled to the second motor; and a second one-way wheel, coupled to the second speed reducer, wherein the power control module generates a second driving voltage according to the voltage control signal, and the second motor drives the second one-way wheel through the second speed reducer according to the second driving voltage.

15. An electric assistive device, comprising:

a power wheel module;

an upper control module, configured to provide a dynamic characteristic parameter; and a power control module, coupled to the power wheel module and the upper control module, wherein in response to operating the electric assistive device in an auxiliary walking mode, the power control module adaptively generates a first vehicle speed parameter according to the dynamic characteristic parameter and a force estimation parameter, and the power control module generates a voltage control signal according to the first vehicle speed parameter, wherein the power control module drives the power wheel module according to the voltage control signal, wherein the power control module determines the force estimation parameter according to $$F_{uc} = M_r \frac{dS_r}{dt} + D_r S_r + F_f + F_s - F_{wc}$$

wherein symbol $F_{uc}$ represents the force estimation parameter, symbol $M_r$ represents an equivalent inertia parameter of the electric assistive device, symbol $S_r$ represents a second vehicle speed parameter of the electric assistive device, symbol $D_r$ represents an equivalent damping of the electric assistive device, symbol $F_f$ represents a Coulomb friction parameter, symbol $F_f$ represents a slope equivalent force parameter, and symbol $F_{wc}$ represents an equivalent force parameter of the electric assistive device.

16. The electric assistive device according to claim 15, wherein the dynamic characteristic parameter comprises at least one of a target inertia and a target damping.

17. The electric assistive device according to claim 16, wherein the power control module determines the first vehicle speed parameter according to $$S_r^* = \frac{1}{M_g s + D_g} F_{uc}$$

wherein symbol $S_r$* represents the first vehicle speed parameter, symbol $M_g$ represents the target inertia, symbol s represents a Laplace transform factor, symbol $D_g$ represents the target damping, and symbol $F_{uc}$ represents the force estimation parameter.

* * * * *